US008811183B1

(12) United States Patent
Anand et al.

(10) Patent No.: US 8,811,183 B1
(45) Date of Patent: Aug. 19, 2014

(54) METHODS AND APPARATUS FOR MULTI-PATH FLOW CONTROL WITHIN A MULTI-STAGE SWITCH FABRIC

(75) Inventors: Prashant Anand, Uttar Pradesh (IN); Hardik Bhalala, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 241 days.

(21) Appl. No.: 13/252,615

(22) Filed: Oct. 4, 2011

(51) Int. Cl.
*G01R 31/08* (2006.01)

(52) U.S. Cl.
USPC .......................................................... 370/237

(58) Field of Classification Search
USPC .................. 370/235–237, 360, 367–8, 380–8
See application file for complete search history.

(56) References Cited

U.S. PATENT DOCUMENTS

| | | | |
|---|---|---|---|
| 5,457,687 A | 10/1995 | Newman | |
| 5,926,473 A | 7/1999 | Gridley | |
| 5,987,008 A | 11/1999 | Simpson et al. | |
| 5,987,028 A | 11/1999 | Yang et al. | |
| 5,991,295 A | 11/1999 | Tout et al. | |
| 6,049,546 A | 4/2000 | Ramakrishnan | |
| 6,073,089 A | 6/2000 | Baker et al. | |
| 6,324,165 B1 | 11/2001 | Fan et al. | |
| 6,370,145 B1 | 4/2002 | Dally et al. | |
| 6,438,107 B1 | 8/2002 | Somiya et al. | |
| 6,512,747 B1 | 1/2003 | Umeuchi et al. | |
| 6,618,357 B1 | 9/2003 | Geyer et al. | |
| 6,621,828 B1 | 9/2003 | Field et al. | |
| 6,657,962 B1 | 12/2003 | Barri et al. | |
| 6,856,622 B1 | 2/2005 | Calamvokis et al. | |
| 6,944,173 B1 | 9/2005 | Jones et al. | |

(Continued)

FOREIGN PATENT DOCUMENTS

| | | |
|---|---|---|
| EP | 1 133 110 A2 | 9/2001 |
| EP | 1 653 685 A1 | 5/2006 |

(Continued)

OTHER PUBLICATIONS

F.K. Liotopoulos et al., "A Modular, 160 Gbps ATM Switch Architecture for Multimedia Networking Support, based on a 3-Stage Clos Network," Proceedings of the International Teletraffic Congress. ITC-16. Teletraffic Engineering in a Competitive World. Edinburgh, UK, Jun. 7, 1999, Amsterdam: Elsevier, NL, vol. 3A, XP000877657 ISBN: 978-0-444-50268-1, pp. 529-538.

(Continued)

*Primary Examiner* — Peter Cheng
(74) *Attorney, Agent, or Firm* — Cooley LLP

(57) ABSTRACT

In some embodiments, an apparatus comprises a switch from a set of switches associated with a stage of a multi-stage switch fabric. The switch is configured to receive a data packet having a destination address of a destination device from a source device, and then store the data packet in a queue of the switch. The switch is configured to define a message based on the queue having an available capacity less than a threshold, and include a congestion root indicator in the message if the switch is a congestion root. The switch is then configured to send the message to the source device such that the source device sends another data packet having the destination address of the destination device to another switch from the set of switches and not to the previous switch if the message includes the congestion root indicator.

20 Claims, 6 Drawing Sheets

(56) References Cited

U.S. PATENT DOCUMENTS

| | | |
|---|---|---|
| 6,973,032 B1 | 12/2005 | Casley et al. |
| 6,977,932 B1 | 12/2005 | Hauck |
| 6,986,161 B2 | 1/2006 | Billhartz |
| 7,027,404 B2 | 4/2006 | Sreejith et al. |
| 7,027,457 B1 | 4/2006 | Chiussi et al. |
| 7,042,842 B2 | 5/2006 | Paul et al. |
| 7,046,631 B1 | 5/2006 | Giroux et al. |
| 7,061,862 B2 | 6/2006 | Horiguchi et al. |
| 7,075,934 B2 | 7/2006 | Chiussi et al. |
| 7,085,846 B2 | 8/2006 | Jenne et al. |
| 7,173,931 B2 | 2/2007 | Chao et al. |
| 7,185,368 B2 | 2/2007 | Copeland, III |
| 7,230,947 B1 | 6/2007 | Huber et al. |
| 7,233,568 B2 | 6/2007 | Goodman et al. |
| 7,234,168 B2 | 6/2007 | Gupta et al. |
| 7,269,666 B1 | 9/2007 | Leitner et al. |
| 7,277,429 B2 | 10/2007 | Norman et al. |
| 7,283,471 B2 | 10/2007 | Gutierrez et al. |
| 7,324,442 B1 | 1/2008 | Pan et al. |
| 7,327,680 B1 | 2/2008 | Kloth |
| 7,372,813 B1 | 5/2008 | Cimino et al. |
| 7,391,736 B2 | 6/2008 | Na et al. |
| 7,403,524 B2 | 7/2008 | Hill |
| 7,424,744 B1 | 9/2008 | Wu et al. |
| 7,430,175 B2 | 9/2008 | Dropps et al. |
| 7,440,448 B1 | 10/2008 | Lu et al. |
| 7,457,245 B2 | 11/2008 | McAlpine et al. |
| 7,519,860 B2 | 4/2009 | Hatonen et al. |
| 7,540,025 B2 | 5/2009 | Tzadikario |
| 7,543,052 B1 | 6/2009 | Cesa Klein |
| 7,564,869 B2 | 7/2009 | Cafiero et al. |
| 7,571,241 B1 * | 8/2009 | Nalawade ............ 709/230 |
| 7,643,418 B1 | 1/2010 | Varier et al. |
| 7,701,849 B1 | 4/2010 | Ma |
| 7,719,982 B2 | 5/2010 | Varma |
| 8,154,996 B2 | 4/2012 | Godbole et al. |
| 8,160,072 B1 | 4/2012 | Gnanasekaran et al. |
| 8,213,308 B2 | 7/2012 | Godbole et al. |
| 8,218,442 B2 | 7/2012 | Godbole et al. |
| 8,228,797 B1 | 7/2012 | Utley et al. |
| 8,254,255 B2 | 8/2012 | Thomas |
| 8,325,749 B2 | 12/2012 | Thomas et al. |
| 2002/0057699 A1 | 5/2002 | Roberts |
| 2002/0064170 A1 | 5/2002 | Siu et al. |
| 2002/0075883 A1 | 6/2002 | Dell et al. |
| 2002/0080789 A1 | 6/2002 | Henderson et al. |
| 2002/0118692 A1 | 8/2002 | Oberman et al. |
| 2002/0154637 A1 | 10/2002 | Keller-Tuberg |
| 2002/0167950 A1 | 11/2002 | Chang et al. |
| 2003/0005145 A1 | 1/2003 | Bullard |
| 2003/0023733 A1 | 1/2003 | Lingafelt et al. |
| 2003/0026267 A1 | 2/2003 | Oberman et al. |
| 2003/0026287 A1 | 2/2003 | Mullendore et al. |
| 2003/0035432 A1 | 2/2003 | Sreejith et al. |
| 2003/0058880 A1 | 3/2003 | Sarkinen |
| 2003/0063348 A1 | 4/2003 | Posey |
| 2003/0115355 A1 * | 6/2003 | Cometto et al. ............ 709/234 |
| 2003/0218977 A1 | 11/2003 | Pan et al. |
| 2004/0001433 A1 | 1/2004 | Gram et al. |
| 2004/0013124 A1 | 1/2004 | Peebles et al. |
| 2004/0165598 A1 | 8/2004 | Shrimali et al. |
| 2005/0036502 A1 | 2/2005 | Blanc et al. |
| 2005/0108444 A1 | 5/2005 | Flauaus et al. |
| 2005/0111460 A1 | 5/2005 | Sahita |
| 2005/0138238 A1 | 6/2005 | Tierney et al. |
| 2005/0138243 A1 | 6/2005 | Tierney et al. |
| 2005/0210533 A1 | 9/2005 | Copeland et al. |
| 2005/0226156 A1 | 10/2005 | Keating et al. |
| 2005/0249214 A1 | 11/2005 | Peng |
| 2005/0276263 A1 | 12/2005 | Suetsugu et al. |
| 2006/0026682 A1 | 2/2006 | Zakas |
| 2006/0056308 A1 * | 3/2006 | Gusat et al. ............ 370/252 |
| 2006/0067225 A1 | 3/2006 | Fedorkow et al. |
| 2006/0104298 A1 | 5/2006 | McAlpine et al. |
| 2006/0120289 A1 | 6/2006 | Cunningham |
| 2006/0123480 A1 | 6/2006 | Oh et al. |
| 2006/0146703 A1 | 7/2006 | Cha et al. |
| 2006/0272018 A1 | 11/2006 | Fouant |
| 2006/0285548 A1 | 12/2006 | Hill et al. |
| 2007/0064617 A1 | 3/2007 | Reves |
| 2007/0067438 A1 | 3/2007 | Goranson et al. |
| 2007/0086464 A1 | 4/2007 | Somashekhar |
| 2007/0094729 A1 | 4/2007 | Hoefelmeyer et al. |
| 2007/0118909 A1 | 5/2007 | Hertzog et al. |
| 2007/0150949 A1 | 6/2007 | Futamura et al. |
| 2007/0180526 A1 | 8/2007 | Copeland, III |
| 2007/0192861 A1 | 8/2007 | Varghese et al. |
| 2007/0240207 A1 | 10/2007 | Belakhdar et al. |
| 2007/0250930 A1 | 10/2007 | Aziz et al. |
| 2007/0268830 A1 | 11/2007 | Li et al. |
| 2008/0028096 A1 | 1/2008 | Henderson et al. |
| 2008/0028467 A1 | 1/2008 | Kommareddy et al. |
| 2008/0080548 A1 | 4/2008 | Mullendore et al. |
| 2008/0082977 A1 | 4/2008 | Araujo et al. |
| 2008/0133517 A1 | 6/2008 | Kapoor et al. |
| 2008/0151863 A1 | 6/2008 | Lawrence et al. |
| 2008/0167920 A1 | 7/2008 | Schmidt et al. |
| 2008/0198746 A1 | 8/2008 | Kwan et al. |
| 2008/0253289 A1 | 10/2008 | Naven et al. |
| 2008/0259798 A1 | 10/2008 | Loh et al. |
| 2008/0263661 A1 | 10/2008 | Bouzida |
| 2008/0285449 A1 | 11/2008 | Larsson et al. |
| 2009/0003212 A1 | 1/2009 | Kwan et al. |
| 2009/0077663 A1 | 3/2009 | Sun et al. |
| 2009/0204964 A1 | 8/2009 | Foley et al. |
| 2009/0300209 A1 | 12/2009 | Elzur |
| 2010/0061238 A1 | 3/2010 | Godbole et al. |
| 2010/0061239 A1 | 3/2010 | Godbole et al. |
| 2010/0061390 A1 | 3/2010 | Godbole et al. |
| 2010/0085891 A1 | 4/2010 | Kind et al. |
| 2010/0158031 A1 | 6/2010 | Thomas et al. |
| 2010/0165843 A1 | 7/2010 | Thomas |
| 2011/0063979 A1 * | 3/2011 | Matthews et al. ............ 370/237 |
| 2011/0154132 A1 | 6/2011 | Aybay |
| 2011/0261697 A1 * | 10/2011 | Crisan et al. ............ 370/235 |
| 2011/0267942 A1 | 11/2011 | Aybay |
| 2011/0310739 A1 | 12/2011 | Aybay |
| 2012/0140626 A1 | 6/2012 | Anand et al. |
| 2012/0195203 A1 | 8/2012 | Godbole et al. |
| 2012/0233349 A1 | 9/2012 | Aybay |
| 2012/0269065 A1 | 10/2012 | Godbole et al. |
| 2012/0275307 A1 | 11/2012 | Godbole et al. |

FOREIGN PATENT DOCUMENTS

| | | |
|---|---|---|
| EP | 1 892 905 A1 | 2/2008 |
| EP | 2 040 420 A2 | 3/2009 |
| EP | 2 180 644 A1 | 4/2010 |
| EP | 2 461 529 A1 | 6/2012 |
| GB | 2 361 139 A | 10/2001 |
| WO | WO 97/04546 | 2/1997 |

OTHER PUBLICATIONS

William J. Daily, "Virtual-Channel Flow Control," IEEE Transactions on Parallel and Distributed Systems, vol. 3, No. 2, Mar. 1992, pp. 194-205.

Mohammad Alizadeh et al. "Data Center TCP (DCTCP)" SIGCOMM'10, Aug. 30-Sep. 3, 2010, New Delhi, India, Copyright 2010 ACM 978-1-4503-0201-Feb. 10, 2008 (12 pages).

Yu-xiang Hu et al. "QoS-supported Scheduling Algorithm in Multistage Switching Fabrics," Computer Science, vol. 35, Issue 5, pp. 81-84,—Translation—Abstract only.

Minkenberg, et al. "Adaptive Routing for Convergence Enhanced Ethernet", IBM Research, Zurich Research Laboratory, 2009, 8 pages.

* cited by examiner

800

Receive, at a switch within a switch fabric, a data packet associated with a data flow between a source device and a destination device.
802

Store the data packet in an output queue of the switch.
804

Select the data packet from a set of data packets in the output queue if an available capacity of the output queue is less than a threshold.
806

Define a message including a portion of a header of the data packet and an indicator of a flow control status of the switch.
808

Send the message from the switch to the source device such that the source device modifies the data flow based on the portion of the header of the data packet and the indicator of the flow control status of the switch.
810

FIG. 8

METHODS AND APPARATUS FOR MULTI-PATH FLOW CONTROL WITHIN A MULTI-STAGE SWITCH FABRIC

BACKGROUND

Some embodiments described herein relate generally to switch fabric systems, and, in particular, to methods and apparatus for multi-path flow control in a multi-stage switch fabric system.

Some known switch fabric systems implement a standard-based flow control method such as the priority-based flow control protocol (i.e., IEEE 802.1Qbb) to resolve congestion problems in the switch fabric. Based on such a standard-based flow control method, when a congestion is built up in the switch fabric, an indication of the congestion (e.g., a congestion notification message) is sent from a congestion point to a source or a congestion reaction point of a data flow. The source or the congestion reaction point of the data flow then uses a multi-path mechanism to select some other paths for the data flow, and/or reduces the rate of the data flow. Because the indication of the congestion does not include information on whether the congestion point is a source or a victim of the congestion, the multi-path mechanism does not help to solve the congestion because the multi-path mechanism typically produces a head-of-line (HOL) blocking problem in the switch fabric if the congestion point is a victim of the congestion.

Accordingly, a need exists for a flow control method that can effectively use multi-path for data flows and avoid head-of-line blocking problems in resolving congestion problems in a multi-stage switch fabric system.

SUMMARY

In some embodiments, an apparatus comprises a switch from a set of switches associated with a stage of a multi-stage switch fabric. The switch is configured to receive a data packet having a destination address of a destination device from a source device, and then store the data packet in a queue of the switch. The switch is configured to define a message based on the queue having an available capacity less than a threshold, and include a congestion root indicator in the message if the switch is a congestion root. The switch is then configured to send the message to the source device such that the source device sends another data packet having the destination address of the destination device to another switch from the set of switches and not to the previous switch if the message includes the congestion root indicator.

BRIEF DESCRIPTION OF THE DRAWINGS

FIG. 8 is a flow chart that illustrates a method for using a received data packet to notify a congestion situation.

DETAILED DESCRIPTION

Figure 1:
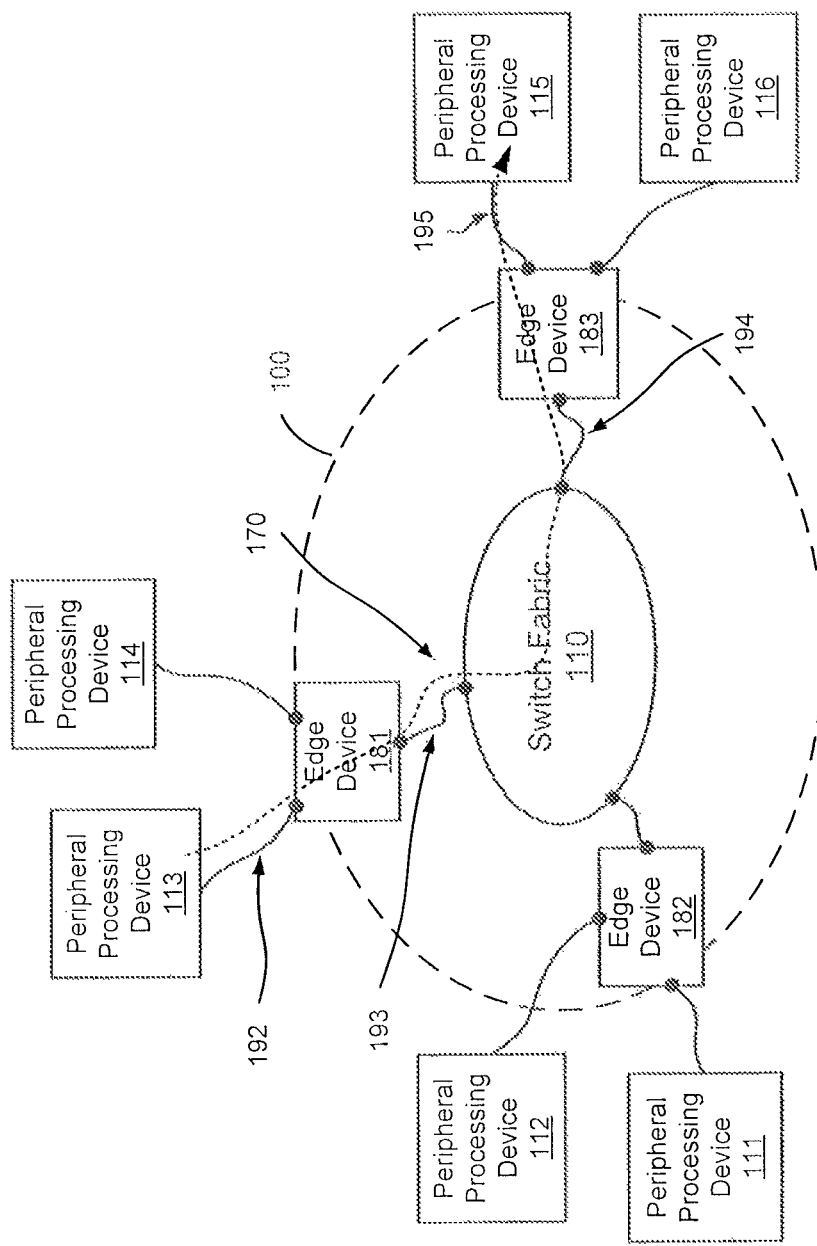
FIG. 1 is a system block diagram of a switch fabric system configured to send data packets from a source device to a destination device, according to an embodiment.

In some embodiments, an apparatus includes a switch from a set of switches that is associated with a stage of a multi-stage switch fabric. The switch is configured to receive a data packet having a destination address of a destination device from a source device, and then configured to stored the data packet in a queue of the switch. In some embodiments, the switch is configured to route the data packet based on a hash function using a header of the data packet as an input.

Based on the queue having an available capacity less than a threshold, the switch is configured to define a message. In some embodiments, if the available capacity of the queue is decreasing and the switch is sending data packets at substantially a maximum rate, the switch is referred as a congestion root. As a result, the switch is configured to include a congestion root indicator in the message. Otherwise, if the switch is sending data packets at a rate less than a data rate threshold (e.g., not at substantially the maximum rate), the switch is referred as a congestion victim. As a result, the switch is configured to not include the congestion root indicator in the message. In some embodiments, the switch is configured to define the message such that the message includes at least one value associated with a header of the data packet.

Furthermore, the switch is configured to send the message to the source device such that the source device sends another data packet having the destination address of the destination device to another switch (i.e., different from the previous switch) from the set of switches if the message includes the congestion root indicator. Additionally, the source device reduces a rate of data packets sent to the destination device in response to the message, regardless of the message including the congestion root indicator or not.

In some embodiments, an apparatus includes a source device configured to send a first data packet to a destination device via a multi-stage switch fabric, which has a set of switches associated with a stage of the multi-stage switch fabric. The first data packet is sent via the switch fabric such that a switch from the set of switches switches the first data packet based on a hash function using a header of the first data packet as an input. In response to the switch from the set of switches receiving the first data packet, the source device is configured to receive a message from the switch, which includes at least one value associated with a header of the first data packet. In some embodiments, the message is sent to the source device in response to a queue at the switch having an available capacity less than a predetermined threshold. In some embodiments, the message indicates that the switch is a congestion root if a number of data packets in the queue at the switch is increasing and the switch is sending data packets at substantially a maximum rate.

In response to the message, the source device is configured to define a header of a second data packet to be sent to the destination device, such that the second data packet is configured to be more likely sent to the destination device via a remaining switch from the set of switches than the first data packet if the message indicates that the switch is the congestion root. In some embodiments, the header of the second data packet defined by the source device is different than the header of the first data packet. In some embodiments, the source device is configured to also reduce a rate at which a set of data packets is sent to the destination device based on the message, regardless of the message identifying the switch as a congestion root or not.

In some embodiments, a non-transitory processor-readable medium stores code that represents instructions to be executed by a processor of, for example, a switch within a multi-stage switch fabric. The non-transitory processor-readable medium stores code that represents instructions to cause the processor of the switch to receive a data packet associated with a data flow between a source device and a destination device, and then store the data packet in a queue of the switch. The non-transitory processor-readable medium stores code that represents instructions to cause the processor of the switch to select the data packet from a set of data packets in the queue if an available capacity of the queue is less than a threshold. The non-transitory processor-readable medium stores code that represents instructions to cause the processor of the switch to define a message including at least a portion of a header of the data packet and an indicator of a flow control status of the switch, and further send the message from the switch to the source device such that the source device modifies the data flow based on the portion of the header of the data packet and the indicator of the flow control status of the switch.

As used herein, the term "physical hop" can include a physical link between two modules and/or devices. For example, a data path operatively coupling a first module with a second module can be said to be a physical hop. Similarly stated, a physical hop can physically link the first module with the second module.

As used herein, the term "single physical hop" can include a direct physical connection between two modules in a system. Similarly stated, a single physical hop can include a link via which two modules are coupled without intermediate modules. Accordingly, for example, if a first module is coupled to a second module via a single physical hop, the first module can send data packets directly to the second module without sending the data packets through intervening modules.

As used herein, the term "single logical hop" means a physical hop and/or group of physical hops that are a single hop within a network topology associated with a first protocol. Similarly stated, according to the topology associated with the first protocol, no intervening nodes exist between a first module and/or device operatively coupled to a second module and/or device via the physical hop and/or the group of physical hops. A first module and/or device connected to a second module and/or device via a single logical hop can send a data packet to the second module and/or device using a destination address associated with the first protocol and the second module and/or device, regardless of the number of physical hops between the first device and the second device. In some embodiments, for example, a second protocol can use the destination address of the first protocol to switch or route a data packet from the first module and/or device to the second module and/or device over the single logical hop. Similarly stated, when a first module and/or device sends data to a second module and/or device via a single logical hop of a first protocol, the first module and/or device treats the single logical hop as if it is sending the data directly to the second module and/or device.

As used herein, the term "switch" can include a layer-2 (i.e., data link layer) networking device that is used to process, switch or forward data items (e.g., data frames) at the data link layer within a switch fabric, such as a network bridge, etc. Similarly, a "switch" can include a layer-3 (i.e., network layer) networking device that is used to process, switch or route data items (e.g., data packets) at the network layer within a switch fabric, such as a layer-3 router, etc. Furthermore, a "switch" can be a consolidated networking device that can be used to process data at multiple layers, such as layer-2, layer-3, and/or one or more layers above the network layer. Such a consolidated switch is also referred to as a multilayer switch. In some embodiments, a "switch" can be a single device that combines functionalities of, for example, a switch, a router and a controller. Such a switch can be referred to as a SRC (switch, router, and controller). As used herein, the term "physical hop" can include a physical link between two modules and/or devices. For example, a data path operatively coupling a first module with a second module can be said to be a physical hop. Similarly stated, a physical hop can physically link the first module with the second module.

As used herein, the term "single physical hop" can include a direct physical connection between two modules in a system. Similarly stated, a single physical hop can include a link via which two modules are coupled without intermediate modules. Accordingly, for example, if a first module is coupled to a second module via a single physical hop, the first module can send data packets directly to the second module without sending the data packets through intervening modules.

In some embodiments, a switch fabric can function as part of a single logical hop (e.g., a single large-scale consolidated L2/L3 switch). Portions of the switch fabric can be physically distributed across, for example, many chassis and/or modules interconnected by multiple physical hops. In some embodiments, for example, a stage of the switch fabric can be included in a first chassis and another stage of the switch fabric can be included in a second chassis. Both of the stages can logically function as part of a single consolidated switch (e.g., within the same logical hop according to a first protocol) but include a separate single physical hop between respective pairs of stages within the consolidated switch. Similarly stated, a physical hop can operatively couple each stage within a switch fabric representing a single logical hop associated with a protocol used to switch or route data outside the switch fabric. Additionally, packet classification and forwarding associated with a protocol used to switch or route data outside a single logical hop need not occur at each stage within the single logical hop. In some embodiments, for example, packet classification and forwarding associated with a first protocol (e.g., Ethernet) can occur prior to a module and/or device sending the data packet to another module and/or device via the single logical hop.

As used in this specification, the singular forms "a," "an" and "the" include plural referents unless the context clearly dictates otherwise. Thus, for example, the term "a switch fabric" is intended to mean a single switch fabric or a combination of switch fabrics.

The terms "first stage", "second stage" and so on refer to portions, modules or nodes within a switch fabric. In some instances, these terms refer to a specific stage within a given switch fabric. For example, a three-stage Clos network includes three consecutive stages from ingress to egress; such a switch fabric has three stages that can be referred to as the "first stage" (the first stage with respect to the ingress to egress direction) through the "third stage" (the third and final stage with respect to the ingress to egress direction). For example, FIG. 2 refers to specific stages within a given multi-stage switch fabric. In other instances, however, the terms "first stage", "second stage" and so on refer to any stage within the switch fabric and correspond to the order of discussion of a given stage. For example, the "first stage" can refer to the first stage discussed and can correspond to any stage within the switch fabric (e.g., the third stage within a three-stage Clos network), and the "second stage" can refer to a remaining stage within the switch fabric (e.g., the first stage within the three-stage Clos network). Thus, it should be understood that the specific context will indicate whether the terms "first stage", "second stage" and so on can refer to a specific ordinal stage within a switch fabric or can refer to any particular stage within the switch fabric.

FIG. 1 is a schematic diagram that illustrates a switch fabric system 100 configured to send data packets from a source device to a destination device, according to an embodiment. The switch fabric system 100 includes a switch fabric 110 and multiple edge devices (e.g., edge devices 181-183). The switch fabric system 100 operatively couples multiple peripheral processing devices (e.g., peripheral processing devices 111-116) to each other. The peripheral processing devices 111-116 can be, for example, compute nodes, service nodes, routers, and storage nodes, etc. In some embodiments, for example, the peripheral processing devices 111-116 include servers, storage devices, gateways, workstations, and/or the like.

The peripheral processing devices 111-116 can be operatively coupled to the edge devices 181-183 of the switch fabric system 100 using any suitable connection such as, for example, an optical connection (e.g., an optical cable and optical connectors), an electrical connection (e.g., an electrical cable and electrical connectors) and/or the like. As such, the peripheral processing devices 111-116 are configured to send data (e.g., data packets) to the switch fabric system 100 via the edge devices 181-183. In some embodiments, the connection between a peripheral processing device 111-116 and an edge device 181-183 is a direct link. Such a link can be said to be a single physical hop link. In other embodiments, the peripheral processing devices can be operatively coupled to the edge devices via intermediary modules. Such a connection can be said to be a multiple physical hop link.

Each edge device 181, 182, 183 can be any device configured to operatively couple peripheral processing devices 111-116 to the switch fabric 110. In some embodiments, for example, the edge devices 181-183 can be access switches, input/output modules, top-of-rack devices and/or the like. Structurally, the edge devices 181-183 can function as both source edge devices and destination edge devices. Accordingly, the edge devices 181-183 can send data (e.g., data packets) to and receive data from the switch fabric 110, and to and from the connected peripheral processing devices 111-116.

In some embodiments, the edge device 181-183 can be a combination of hardware modules and software modules (executing in hardware). In some embodiments, for example, each edge device 181, 182, 183 can include a field-programmable gate array (FPGA), an application specific integrated circuit (ASIC), a digital signal processor (DSP) and/or the like.

The edge devices 181-183 can be configured to prepare a data packet (e.g., an Ethernet packet) to enter the switch fabric 110. In some embodiments, a source edge device 181-183 can be configured to define a header for the data packet, which includes a value that can be used to switch or route the data packet through the switch fabric 110 to a destination edge device 181-183. For example, the source edge device 181-183 can be configured to switch or route the data packet via an egress port of the source edge device 181-183 to a switch of the switch fabric 110 based on a hash function using the value in the header as an input, where the header is defined for the data packet at the source edge device 181-83. Similarly, one or more switches within the switch fabric 110 can be configured to switch or route the data packet through the switch fabric 110 to the destination edge device 181-183 based on a hash function using the value in the header as an input. Detail of routing a data packet based on for example, a hash function, using a value in a header of the data packet at an edge device or a switch is further described with respect to FIGS. 3-6.

Each edge device 181-183 is configured to communicate with the other edge devices 181-183 via the switch fabric 110. Specifically, the switch fabric 110 is configured to provide any-to-any connectivity between the edge devices 181-183 at relatively low latency. For example, switch fabric 110 can be configured to transmit (e.g., convey) data between edge devices 181-183. In some embodiments, the switch fabric 110 can have at least hundreds or thousands of ports (e.g., egress ports and/or ingress ports) through which edge devices 181-183 can transmit and/or receive data. As described in further detail herein, each edge device 181-183 can be configured to communicate with the other edge devices 181-183 over multiple data paths. More specifically, in some embodiments, multiple data paths containing different sets of switches exist within the switch fabric 110, between a first edge device and a second edge device.

The edge devices 181-183 can include one or more network interface devices (e.g., a 40 Gigabit (Gb) Ethernet interface, a 100 Gb Ethernet interface, etc.) through which the edge devices 181-183 can send signals to and/or receive signals from the switch fabric 110. The signals can be sent to and/or received from the switch fabric 110 via an electrical link, an optical link, and/or a wireless link operatively coupled to the edge devices 181-183. In some embodiments, the edge devices 181-183 can be configured to send signals to and/or receive signals from the switch fabric 110 based on one or more protocols (e.g., an Ethernet protocol, a multi-protocol label switching (MPLS) protocol, a Fibre Channel protocol, a Fibre-Channel-over Ethernet protocol, an Infiniband-related protocol, a cell-based protocol, etc.).

The switch fabric 110 can be any suitable switch fabric that operatively couples the edge devices 181-183 to the other edge devices 181-183 via multiple data paths. In some embodiments, for example, the switch fabric 110 can be a Clos network (e.g., a non-blocking Clos network, a strict sense non-blocking Clos network, a Benes network) having multiple stages of switch modules (e.g., integrated Ethernet switches). In some embodiments, for example, the switch fabric 110 can be similar to the switch fabric 200 shown in FIG. 2 and described in further detail herein, which has three stages. In other embodiments, the switch fabric 110 shown in FIG. 1 can include any number of stages. In such embodiments, for example, the switch fabric 110 can include three, five, seven or nine stages. The switch fabric 110 can be, for example, part of a core portion of a data center similar to the core portion of the data center described in co-pending U.S. patent application Ser. No. 12/495,337, filed Jun. 30, 2009, and entitled "Methods and Apparatus Related to Any-to-Any Connectivity Within a Data Center," which is incorporated herein by reference in its entirety.

In some embodiments, the switch fabric 110 can be (e.g., can function as) a single consolidated switch (e.g., a single large-scale consolidated L2/L3 switch). In other words, the switch fabric 110 can be configured to operate as a single logical entity (e.g., a single logical network element). Similarly stated, the switch fabric 110 can be part of a single logical hop between a first edge device 181, 182, 183 and a second edge device 181, 182, 183 (e.g., along with the data paths between the edge devices 181-183 and the switch fabric 110). The switch fabric 110 can be configured to connect (e.g., facilitate communication between) the peripheral processing devices 111-116. In some embodiments, the switch fabric 110 can be configured to communicate via interface devices (not shown) that are configured to transmit data at a rate of at least 10 Gb/s. In some embodiments, the switch fabric 110 can be configured to communicate via interface devices (e.g., fibre-channel interface devices) that are configured to transmit data at a rate of, for example, 2 Gb/s, 4 Gb/s, 8 Gb/s, 10 Gb/s, 40 Gb/s, 100 Gb/s and/or faster link speeds.

Although the switch fabric 110 can be logically centralized, the implementation of the switch fabric 110 can be highly distributed, for example, for reliability. For example, portions of the switch fabric 110 can be physically distributed across, for example, many chassis. In some embodiments, for example, a stage of the switch fabric 110 can be included in a first chassis and another stage of the switch fabric 110 can be included in a second chassis. Both of the stages can logically function as part of a single consolidated switch (e.g., within the same logical hop) but have a separate single physical hop between respective pairs of stages. More details related to architecture of a multi-stage switch fabric are described herein with respect to FIGS. 2, 3 and 7.

In use, a data packet (e.g., an Ethernet packet) can be sent between peripheral processing devices 111-116 via portions of the switch fabric system 100. For example, as shown in FIG. 1, a data packet can be sent from a first peripheral processing device 113 to a second peripheral processing device 115 via path 170. The first peripheral processing device 113 can send the data packet to the edge device 181 via link 192. The edge device 181 can prepare the data packet to enter the switch fabric 110 by defining a header for the data packet, and can then route the data packet via a link (e.g., shown as the link 193 in FIG. 1) to a switch in the switch fabric 110 based on a value in the defined header. Similar to the edge device 181, one or more switches within the switch fabric 110 can route the data packet through the switch fabric 110 based on the value in the define header of the data packet. Eventually, the data packet is switched or routed from a switch in the switch fabric 110 to the edge device 183 via a link (e.g., shown as the link 194 in FIG. 1), which can then forward the data packet to peripheral processing device 115 via link 195.

Figure 2:
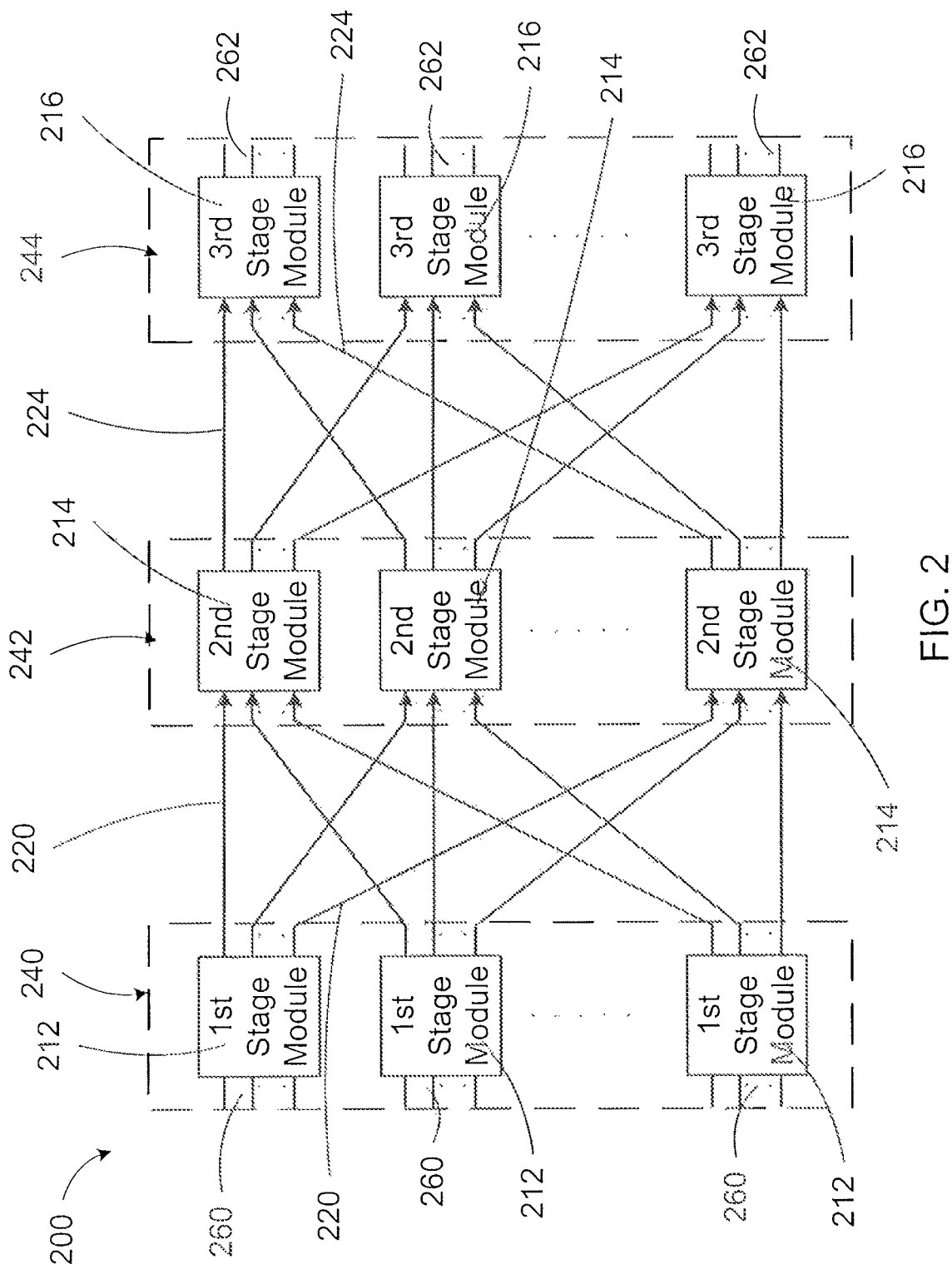
FIG. 2 is a schematic illustration of a multi-stage switch fabric, according to an embodiment.

FIG. 2 is a schematic illustration of a multi-stage switch fabric 200, according to an embodiment. The switch fabric 200 can include multiple physical hops that are within a single logical hop. In some embodiments, switch fabric 200 can be a multi-stage, non-blocking Clos network that includes a first stage 240, a second stage 242, and a third stage 244. The first stage 240 includes switch modules 212; the second stage 242 includes switch modules 214; the third stage 244 includes switch modules 216. Said another way, switch modules 212 of the first stage 240, switch modules 214 of the second stage 242 and switch modules 216 of the third stage 244 collectively define the multi-stage switch fabric 200.

In the switch fabric 200, each switch module 212 of the first stage 240 is an assembly of electronic components and circuitry. In some embodiments, for example, each switch module is an application-specific integrated circuit (ASIC). In other embodiments, multiple switch modules are contained on a single ASIC or a single chip package. In still other embodiments, each switch module is an assembly of discrete electrical components.

In some embodiments, each switch module 212 of the first stage 240 is a switch (e.g., a packet switch, a frame switch, an integrated Ethernet switch and/or a cell switch). The switches are configured to redirect data (e.g., data packets) as it flows through the switch fabric 200. In some embodiments, for example, each switch includes multiple ingress ports operatively coupled to write interfaces on a memory buffer (not shown in FIG. 2). Similarly, a set of egress ports are operatively coupled to read interfaces on the memory buffer. In some embodiments, the memory buffer can be a shared memory buffer implemented using on-chip static random access memory (SRAM) to provide sufficient bandwidth for all ingress ports to write one incoming data packet per time period (e.g., one or more clock cycles) and for all egress ports to read one outgoing data packet per time period. Each switch operates similarly to a crossbar switch that can be reconfigured in subsequent each time period.

Each switch module 212 of the first stage 240 includes a set of ingress ports 260 configured to receive data (e.g., a data packet) as it enters the switch fabric 200. For example, each ingress port 260 can be coupled to an edge device (e.g., edge devices 181, 182, 183 shown and described with respect to FIG. 1). In some embodiments, more than one ingress port 260 of a switch module 212 can be coupled to different ports of a common edge device via separate physical connections (e.g., multiple electrical cables, multiple fiber-optic cables, etc.). Accordingly, an edge device can send data to the switch fabric 200 via the ingress ports 260. In this embodiment, each switch module 212 of the first stage 240 includes the same number of ingress ports 260.

Similar to the first stage 240, the second stage 242 of the switch fabric 200 includes switch modules 214. The switch modules 214 of the second stage 242 are structurally similar to the switch modules 212 of the first stage 240. Each switch module 214 of the second stage 242 is operatively coupled to each switch module 212 of the first stage 240 by a data path 220. Each data path 220 between a given switch module 212 of the first stage 240 and a given switch module 214 of the second stage 242 is configured to facilitate data transfer from the switch modules 212 of the first stage 240 to the switch modules 214 of the second stage 242.

The data paths 220 between the switch modules 212 of the first stage 240 and the switch modules 214 of the second stage 242 can be constructed in any manner configured to facilitate data transfer from the switch modules 212 of the first stage 240 to the switch modules 214 of the second stage 242. In some embodiments, for example, the data paths 220 are optical connectors between the switch modules. In other embodiments, the data paths 220 are within a midplane. Such a midplane can be similar to that described in U.S. application Ser. No. 12/345,500, filed Dec. 29, 2008, and entitled "System Architecture for a Scalable and Distributed Multi-Stage Switch Fabric," which is incorporated herein by reference in its entirety. Such a midplane can be used to connect each switch module 214 of the second stage 242 with each switch module 212 of the first stage 240. In still other embodiments, two or more switch modules are contained within a single chip package and the data paths are electrical traces.

In some embodiments, the switch fabric 200 is a non-blocking Clos network. Thus, the number of switch modules 214 of the second stage 242 of the switch fabric 200 varies based on the number of ingress ports 260 of each switch module 212 of the first stage 240. In a rearrangeably non-blocking Clos network (e.g., a Benes network), the number of switch modules 214 of the second stage 242 is greater than or equal to the number of ingress ports 260 of each switch module 212 of the first stage 240. Thus, if n is the number of ingress ports 260 of each switch module 212 of the first stage 240 and m is the number of switch modules 214 of the second stage 242, m≥n. In some embodiments, for example, each switch module 212 of the first stage 240 has five ingress ports.

Thus, the second stage 242 has at least five switch modules 214. Each of the switch modules 212 of the first stage 240 is operatively coupled to all the switch modules 214 of the second stage 242 by data paths 220. Said another way, each switch module 212 of the first stage 240 can send data to any switch module 214 of the second stage 242.

The third stage 244 of the switch fabric 200 includes switch modules 216. The switch modules 216 of the third stage 244 are structurally similar to the switch modules 212 of the first stage 240. The number of switch modules 216 of the third stage 244 is typically equivalent to the number of switch modules 212 of the first stage 240. Each switch module 216 of the third stage 244 includes egress ports 262 configured to allow data to exit the switch fabric 200. For example, each egress port 262 can be coupled to an edge device (e.g., edge devices 181, 182, 183 shown and described with respect to FIG. 1). In some embodiments, similar to switch module 212 of the first stage 240, more than one egress port 262 of a switch module 216 can be coupled to different ports of a common edge device via separate physical connections (e.g., multiple electrical cables, multiple fiber-optic cables, etc.). Accordingly, the edge device can receive data from the switch fabric 200 via the egress port 262. In this embodiment, each switch module 216 of the third stage 244 includes the same number of egress ports 262. Further, the number of egress ports 262 of each switch module 216 of the third stage 244 is typically equivalent to the number of ingress ports 260 of each switch module 212 of the first stage 240.

Each switch module 216 of the third stage 244 is connected to each switch module 214 of the second stage 242 by a data path 224. The data paths 224 between the switch modules 214 of the second stage 242 and the switch modules 216 of the third stage 244 are configured to facilitate data transfer from the switch modules 214 of the second stage 242 to the switch modules 216 of the third stage 244.

The data paths 224 between the switch modules 214 of the second stage 242 and the switch modules 216 of the third stage 244 can be constructed in any manner configured to facilitate data transfer from the switch modules 214 of the second stage 242 to the switch modules 216 of the third stage 244. In some embodiments, for example, the data paths 224 are optical connectors between the switch modules. In other embodiments, the data paths are within a midplane. Such a midplane can be used to connect each switch module 214 of the second stage 242 with each switch module 216 of the third stage 244. In still other embodiments, two or more switch modules are contained within a single chip package and the data paths are electrical traces.

In some embodiments, data can be routed through the switch fabric 200 using for example, hash functions, lookup tables, routing tables and/or the like. For example, a first stage switch module 212 can determine to which second stage switch module 214 to send a data packet by using a header value of the data packet as an input to a hash function. A result of the hash function can be an identifier of a second stage switch module 214, or equivalently, an identifier of an egress port of the first stage switch module 212 that is coupled to a second stage switch module 214. The first stage switch module 212 can then send the data packet to the second stage switch module 214 accordingly. Similarly, a second stage switch module 214 and/or a third stage switch module 216 can determine to which third stage switch module 216 or edge device (i.e., an edge device coupled to an egress port 262) to send the data packet, respectively, using a hash function that takes the header value of the data packet as an input. Detail of routing a data packet based on for example, a hash function, using a header value of a data packet at a switch is further described with respect to FIGS. 3-6.

Figure 3:
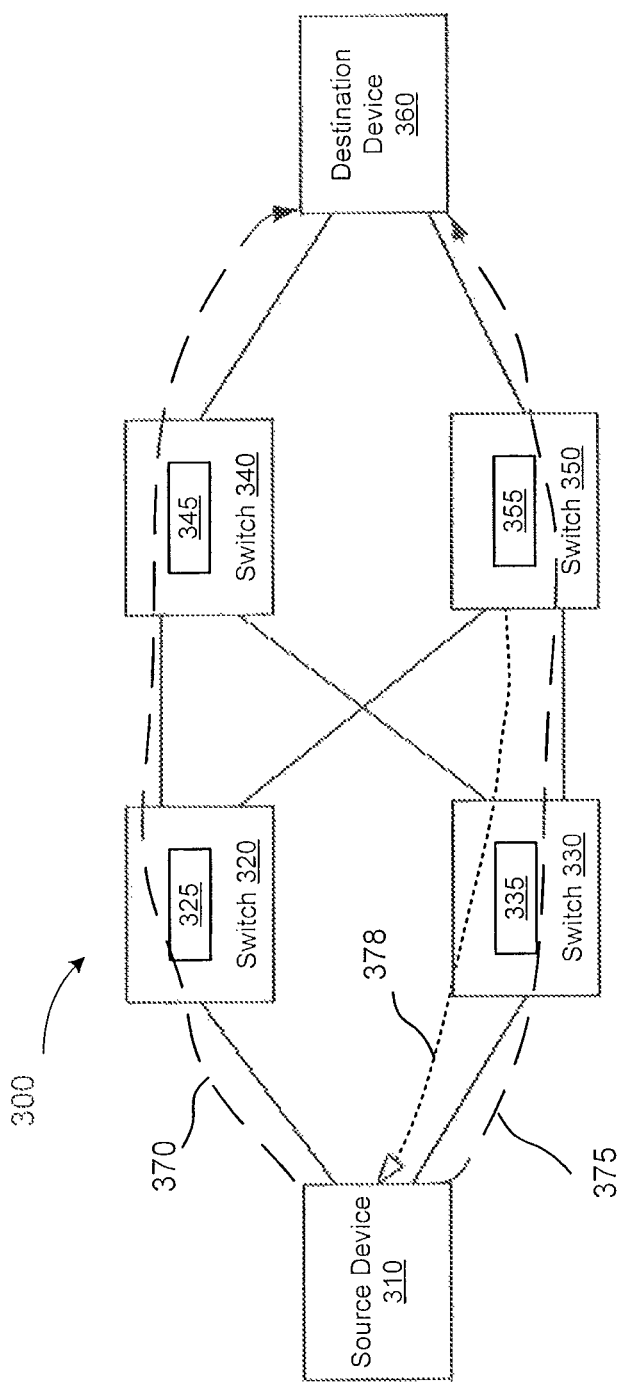
FIG. 3 is a schematic illustration of sending data packets from a source device to a destination device through a multi-stage switch fabric, according to another embodiment.

FIG. 3 is a schematic illustration of sending data packets from a source device to a destination device through a multi-stage switch fabric 300, according to another embodiment. As shown in FIG. 3, the switch fabric 300 operatively couples a source device 310 with a destination device 360 such that source device 310 can send data traffic (e.g., data packets) to destination device 360 through the switch fabric 300. Source device 310 or destination device 360 can be any device that is coupled to one or more switches of the switch fabric 300 and can send data packets to and/or receive data packets from the switch(es). For example, source device 310 or destination device 360 can be an edge device that is structurally and functionally similar to the edge devices 181-183 shown and described with respect to FIG. 1.

The multi-stage switch fabric 300 includes switches 320 and 330, which are associated with a first stage of the switch fabric 300; and switches 340 and 350, which are associated with a second stage of the switch fabric 300. The switches within the switch fabric 300 are structurally and functionally similar to the switch modules in the switch fabric 200 shown and described with respect to FIG. 2. Specifically, switch 320, 330, 340 or 350 can be, for example, any assembly and/or set of operatively-coupled electrical components and circuitry, or an application-specific integrated circuit (ASIC). In some embodiments, switch 320, 330, 340 or 350 can include, for example, a memory, a processor, electrical traces, optical connectors, software (stored or executing in hardware) and/or the like. In some embodiments, the memory included in a switch within the switch fabric 300 can be, for example, a random-access memory (RAM) (e.g., a dynamic RAM, a static RAM), a flash memory, a removable memory, and/or so forth. Furthermore, each switch 320, 330, 340 or 350 has an output queue 325, 335, 345 or 355, respectively, which is used to store data packets in a queue before sending the data packets to a switch of a next stage or to destination device 360. Details of an output queue are described below with respect to FIG. 4. While shown and described herein as being an output queue, in other embodiments, any queue configured to store data packets at a switch can be used. In some embodiments, for example, the queue can be an input queue configured to receive and store data packets from input ports of a switch.

As shown in FIG. 3, switches of the switch fabric 300 can be configured to switch or route data packets sent from source device 310 to destination device 360 via multiple data paths through the switch fabric 300 (e.g., data paths 370 and 375 in FIG. 3). Initially, upon receiving a data packet from a device (not shown in FIG. 3) coupled to source device 310, source device 310 can be configured to define a header for the data packet before sending the data packet into the switch fabric 300. The device that sends the data packet to source device 310 can be for example, a peripheral processing device similar to the peripheral processing devices 111-116 in FIG. 1, and source device 310 can be for example, an edge device similar to the edge devices 181-183 in FIG. 1. Alternatively, source device 310 can be configured to originate a data packet, including defining a header for the data packet, and then send the data packet to destination device 360 through the switch fabric 300. For example, source device 310 can be a compute device that can establish a communication session with destination device 360, which is another compute device, through the switch fabric 300 without the assistance from any edge device.

Figure 5:
FIG. 5 is a schematic illustration of the structure of a data packet, according to an embodiment.

FIG. 5 is a schematic illustration of the structure of a data packet 500 that is sent from a source device (e.g., source device 310) into a switch fabric (e.g., the switch fabric 300), according to an embodiment. Data packet 500 includes a packet header 510 and a payload 520. The source device can be configured to define packet header 510 for data packet 500, which contains information that is associated with the communication session for data packet 500. For example, packet header 510 can include a destination address (e.g., an IP address, a MAC address, etc.) of a destination device (e.g., destination device 360) of the communication session, and/or a source address of a source device (e.g., source device 310) of the communication session. Thus, a switch of the switch fabric that receives data packet 500 can identify a source and/or a destination of data packet 500 from packet header 510. Additionally, payload 520 contains actual data payload carried by data packet 500, one or more packet headers associated with a higher level protocol (e.g., a TCP header, a hypertext transfer protocol (HTTP) header, a simple mail transfer protocol (SMTP) header, etc.), and/or other control information associated with the communication session for data packet 500, etc.

In some embodiments, the source device that sends data packet 500 into the switch fabric can be configured to include a value in packet header 510, which can be used to switch or route data packet 500 through the switch fabric. As described in further detail herein, the source device or a switch of the switch fabric can be configured to select an egress port from a set of egress ports of the source device or the switch, based on the value included in packet header 510, such that data packet 500 is sent out via the selected egress port. In some embodiments, such a selection can be done by using, for example, a hash function that takes the value included in packet header 510 as an input. Alternatively, the hash function can take the entire packet header 510 including the value, or the value plus any portion of packet header 510, as an input. In such embodiments, the value included in packet header 510 can be any value that is a valid input to the hash function. In some embodiments, once packet header 510 including the value is defined at the source device, packet header 510 cannot be modified by any switch of the switch fabric that receives data packet 500. In other words, the source device and all the switches of the switch fabric that receive data packet 500 are configured to switch or route data packet 500 based on the same value included in packet header 510 that is defined by the source device.

Returning to FIG. 3, after a packet header including a value for switching or routing is defined for a data packet at source device 310, source device 310 can be configured to send the data packet to a switch (e.g., switch 320, switch 330) of the first stage of the switch fabric 300. Specifically, source device 310 can be configured to select an egress port, based on the value included in the packet header of the data packet, from a set of egress ports of source device 310, each of which is coupled to a switch associated with the first stage of the switch fabric 300. Source device 310 is then configured to send the data packet to a switch via the selected egress port. In some embodiments, such a selection can be done by, for example, a hash function at source device 310. For example, source device 310 is configured to determine an output value using a hash function that takes the value included in the packet header of the data packet as an input, where the output value is associated with (e.g., mapped to) an index of an egress port of source device 310 that is coupled to switch 330. Thus, source device 310 is configured to send the data packet to switch 330 via the egress port that is associated with the output value of the hash function, shown as a portion of data path 375 in FIG. 3.

After receiving the data packet from source device 310, switch 330 can be configured to store the data packet in an output queue 335 within switch 330. At a later time, switch 330 can be configured to send the data packet to a switch associated with the second stage of the switch fabric 300 (i.e., switch 340, switch 350). Similar to source device 310, switch 330 can be configured to select an egress port that is coupled to a switch of the second stage of the switch fabric 300 by using a hash function that takes the value included in the packet header of the received data packet as an input. For example, switch 330 can be configured to determine an output value using a hash function that takes the value included in the packet header of the received data packet as an input, where the output value is associated with (e.g., mapped to) an index of an egress port of switch 330 that is coupled to switch 350. Thus, switch 330 is configured to send the received data packet to switch 350 via the egress port that is associated with the output value of the hash function, shown as a portion of data path 375 in FIG. 3. In some embodiments, the hash function used at a switch (e.g., switch 330) can be different from the hash function used at a source device (e.g., source device 310) or another switch (e.g., switch 320).

Similar to switch 330, switch 350 can be configured to store the data packet in an output queue 355 within switch 350 after receiving the data packet from switch 330. At a later time, switch 350 can be configured to send the data packet to destination device 360 based on the destination address of destination device 360 included in the packet header of the data packet, shown as a portion of data path 375 in FIG. 3. Thus, the data packet is sent from source device 310 to destination device 360 via switch 330 and switch 350, which are associated with the first stage and the second stage of the switch fabric 300, respectively. A data packet sent from a source device to a destination device via a data path through a switch fabric is associated with a data flow, which is defined by the source device, the destination device and the data path. For example, a data flow that includes the data packet discussed above is defined by source device 310, destination device 360, and data path 375 as shown in FIG. 3.

Figure 4:
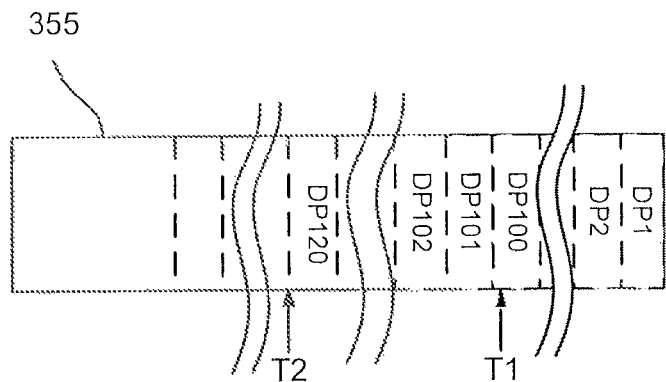
FIG. 4 is a schematic illustration of an output queue of a switch in a switch fabric system, according to an embodiment.

FIG. 4 is a scheme illustration of output queue 355 of switch 350 in the switch fabric 300, according to an embodiment. As shown in FIG. 4, data packets (e.g., DP1, DP2, DP100, DP101, DP102, DP120, etc.) received at switch 350 are stored in output queue 355 at a given time, where DP1 represents the data packet stored at a memory unit that is at the first position of output queue 355 at the given time, DP2 represents the data packet stored at another memory unit that is at the second position of output queue 355 at the given time, etc. In some embodiments, the positions of data packets being placed in output queue 355 represent a logic relation associated with the data packets, and do not necessarily represent any relation of the physical locations (e.g., memory units) where the data packets are stored. For example, DP2 is placed in a position immediately after the position of DP1 in output queue 355, but the memory unit where DP2 is physically stored can be apart from the memory unit where DP1 is physically stored.

The data packets stored in output queue 355 can be received from various switches (e.g., switch 330, switch 320) associated with the first stage of the switch fabric 300, and can be associated with different data flows. For example, DP100 and DP120 can be associated with the data flow that includes data packets sent from source device 310 to destination device 360 via switch 330 and switch 350 (i.e., via data path 375 shown in FIG. 3); DP101 and DP102 can be associated with another data flow that includes data packets sent from source device 310 to another destination device (not shown in FIG. 3) via switch 320 and switch 350; etc. Data packets stored in output queue 355 in an order are typically processed and sent out from switch 350 based on the same order (i.e., first-in-first-out (FIFO)). For example, DP1 is processed and sent out from switch 350 at a first time; DP2 is processed and sent out from switch 350 at a second time later than the first time; etc. Furthermore, after a data packet at the first position of output queue 355 (e.g., DP1) is sent out from switch 350, each remaining data packet in output queue 355 moves one position up in output queue 355 consequently. That is, DP2 moves to the first position of output queue 355, the data packet previously at the third position of output queue 355 moves to the second position of output queue 355, etc. Thus, after a data packet stored in output queue 355 is sent out from switch 350, the total number of data packets stored in output queue 355 is reduced by 1.

In some embodiments, when the number of data packets stored in an output queue of a switch reaches a threshold, or equivalently, when the output queue of the switch has an available capacity less than a threshold (note that the total capacity of an output queue of a switch is typically a fixed value), the switch can determine that it is in a congestion situation. As shown in FIG. 4, when the number of data packets stored in output queue 355 reaches 120, or equivalently, when output queue 355 has an available capacity less than a threshold (represented by T2 in FIG. 4), switch 350 can determine that it is in a congestion situation.

Furthermore, a switch in a congestion situation can determine whether it is a congestion root or not. Specifically, if the number of data packets stored in the output queue of the switch is increasing (or equivalently, if the available capacity of the output queue of the switch is decreasing), and the switch is sending data packets at substantially a maximum rate (or in other words, the switch is not under flow control), then the switch can determine that it is a congestion root. Otherwise, if the number of data packets stored in the output queue of the switch is over a threshold (or equivalently, if the available capacity of the output queue of the switch is less than a threshold), but the switch is sending data packets at a rate less than a data rate threshold that is substantially less than the maximum rate, then the switch can determine that it is not a congestion root. In the example of FIGS. 3-4, because as many as 120 data packets are stored in output queue 355 (or equivalently, the available capacity of output queue 355 is less than the threshold represented by T2), and if switch 350 is sending data packets to destination device 360 at substantially a maximum rate for switch 350, switch 355 can determine that it is a congestion root. In contrast, because the available capacity of output queue 335 is less than a threshold, but if switch 330 is sending data packets to switch 340 and switch 350 at a rate less than a data rate threshold that is substantially less than a maximum rate for switch 330 (in other words, switch 330 is not sending data packets at substantially the maximum rate), switch 330 can determine that it is not a congestion root. In some embodiments, a switch in a congestion situation is referred to as a congestion victim if it is not determined as a congestion root.

Returning to FIG. 3, in response to determining a congestion situation and the type of the congestion (e.g., a congestion root, a congestion victim), a switch can be configured to define a congestion message and then send the congestion message to a source device of a data flow to notify the source device of the congestion situation. Specifically, a switch in a congestion situation can define a congestion message based on a data packet selected from the set of data packets stored in the output queue of the switch. In the example of FIGS. 3-4, after switch 350 determines that it is in a congestion situation and it is a congestion root, switch 350 can be configured to define a congestion message based on a data packet selected from the data packets stored in output queue 355. Such a data packet can be selected in various methods. In one method, a data packet at a specific position of output queue 355 can be selected. For example, the data packet at the $120^{th}$ position of output queue 355 (i.e., DP120), which makes the number of data packets in output queue 355 reach the threshold of T2, can be selected. In another method, each data packet can be randomly selected from all data packets stored in output queue 355 with an equal probability. In such a method, data packets associated with a data flow that has the most number of data packets stored in output queue 355 have a higher probability of being selected than data packets associated with other data flows. In other words, data packets associated with the data flow that contributes most to the congestion situation at switch 355 is most likely to be selected. Subsequently, a congestion message to be sent to a source device can be defined based on the selected data packet.

Figure 6:
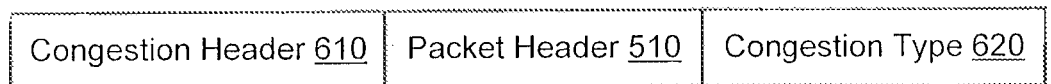
FIG. 6 is a schematic illustration of the structure of a congestion message, according to an embodiment.

FIG. 6 is a schematic illustration of the structure of a congestion message 600, which is defined based on data packet 500 described with respect to FIG. 5, according to an embodiment. Congestion message 600 includes a congestion header 610, a packet header 510 (or a portion of packet header 510) of data packet 500, and a congestion type field 620. Congestion header 610 can contain information associated with an originator (e.g., switch 350) and a destination (e.g., source device 310) of congestion message 600, such that congestion message 600 can be routed from the originator to the destination at each intermediary switch or device appropriately. In some embodiments, the destination of a congestion message defined at a switch is the source of the data packet on which the congestion message is based, such that the congestion message can be sent back to the exact source device that sent the data packet to the switch previously. In the example of FIGS. 3-6, after data packet 500 is selected to be used to define congestion message 600 at switch 350, the information associated with source device 310 is retrieved from packet header 510 because source device 310 is the source of data packet 500, and then the information associated with source device 310 is included in congestion header 610 as the destination of congestion message 600, and information associated with switch 350 is included in congestion header 610 as the originator of congestion message 600.

In some embodiments, a packet header of a data packet on which a congestion message is based can be included in the congestion message. As a result, the value included in the packet header of the data packet, which is used as an input to for example a hash function to switch or route the data packet through a switch fabric, can be included in the congestion message. For example, as shown in FIGS. 5-6, packet header 510 of data packet 500, on which congestion message 600 is based, is included in congestion message 600. Consequently, the value included in packet header 510, which is used by a source device (e.g., source device 310) and switches (e.g., switch 320, 330) to switch or route data packet 500 through a switch fabric (e.g., switch fabric 300), is also included in congestion message 600. Alternatively, in some other embodiments, a portion of a packet header of a data packet, including a value used to switch or route the data packet through a switch fabric, can be included in a congestion message that is defined based on the data packet.

Furthermore, in some embodiments, a congestion message defined at a switch in a congestion situation can also include a congestion type field (shown as congestion type 620 in FIG. 6) that contains information identifying if the switch is a congestion root or not. For example, congestion message 600 defined at switch 350, which is in a congestion situation and is a congestion root, includes information in congestion type

620 that identifies switch 350 as a congestion root. For another example, another congestion message defined at switch 330, which is in a congestion situation and is a congestion victim, includes information in a congestion type field within that congestion message that identifies switch 330 as a congestion victim instead of a congestion root. In some embodiments, if a switch is a congestion root, a congestion type field of a congestion message defined at the switch can include a congestion root indicator. Otherwise, if the switch is a congestion victim, the congestion type field of the congestion message defined at the switch can include a congestion victim indicator. In some embodiments, a congestion type field of a congestion message defined at a switch can include an indicator of a flow control status of the switch, which identifies the switch is a congestion root or not.

Returning to FIG. 3, after a congestion message is defined based on a received data packet at a switch that is in a congestion situation, the switch can be configured to send the congestion message to a source device of the data packet. In some embodiments, the congestion message can be routed from the switch to the source device via the same data path (with an opposite direction) initially traveled by the data packet. In such embodiments, each intervening switch on the data path including the switch that originates the congestion message is configured to record information associated with the data path when they received and/or sent the data packet. Thus, when the switch originates or receives the congestion message, it can determine, based on the congestion message and the recorded information, from which switch or source device it previously received the data packet associated with the congestion message. Subsequently, the switch can be configured to send the congestion message to the determined switch or source device accordingly. For example, as shown in FIG. 3, switch 350 receives a data packet (e.g., data packet 500 shown in FIG. 5) sent from source device 310 via switch 330, shown as a portion of data path 375 in FIG. 3. In response to determining to be in a congestion situation, switch 350 is configured to define a congestion message (e.g., congestion message 600 shown in FIG. 6) based on the data packet, and then send the congestion message back to source device 310. Particularly, the congestion message is sent from switch 350 to source device 310 via the same data path (with an opposite direction) initially traveled by the data packet, i.e., via switch 330 shown within data path 378 in FIG. 3. In some other embodiments, the congestion message is not necessarily routed from the switch to the source device via the same data path (with an opposite direction) initially traveled by the data packet. Instead, the congestion message can be routed from the switch to the source device via any route. For example, switch 350 can be configured to send the congestion message to source device 310 via switch 320, which is a different data path (not shown in FIG. 3) from the one initially traveled by the data packet and on which the congestion message is based.

In response to receiving a congestion message from a switch that is in a congestion situation, a source device can take actions to regulate a data flow sent from the source device, such that the data rate at which the source device sends data packets of the data flow to the congested switch is reduced. To determine the data flow to be regulated, the source device first can be configured to retrieve, from the received congestion message, information associated with the data packet on which the congestion message is based. As a result, the source device can determine a data flow associated with the data packet by identifying a destination device and a value used for switching or routing from the retrieved information. For example, as shown in FIG. 6, upon receiving congestion message 600 that is defined based on data packet 500, a source device can be configured to retrieve information from packet header 510 of data packet 500, or at least a portion of packet header 510 of data packet 500 that includes a destination address of a destination device and a value used for switching or routing data packet 500, from congestion message 600. Based on the retrieved information, the source device can determine the destination device and the value used for switching or routing that are associated with the data flow that included data packet 500. Thus, the source device can determine the data flow that is to be regulated.

In some embodiments, upon receiving a congestion message from a switch in a congestion situation, a source device can be configured to determine if the congested switch is a congestion root or not based on the received congestion message. For example, the source device can determine the congested switch is a congestion root if a congestion root indicator is determined to be included in the congestion message; otherwise the source device can determine the congested switch is a congestion victim instead of a congestion root. Alternatively, if an indicator of a flow control status is included in the received congestion message, the source device can determine the congestion switch is a congestion root or not by checking the indicator of the flow control status. In the example of FIGS. 3-6, switch 350 is configured to send to source device 310 congestion message 600, which includes a congestion root indicator in congestion type field 620, or alternatively, an indicator of the flow control status of switch 350 in congestion type field 620 that identifies switch 350 as a congestion root. As a result, source device 310 is configured to determine switch 350 is a congestion root by checking congestion type field 620 of congestion message 600.

In some embodiments, if a source device determines a data flow to be regulated based on a congestion message sent from a switch, and determines the switch is a congestion root based on the congestion message, the source device can be configured to modify data packets associated with the data flow such that the data rate at which the source device sends the data packets associated with the data flow to the congested switch is reduced. As described above, upon receiving a congestion message defined based on a first data packet sent to a destination device from a source device, the source device can be configured to retrieve information associated with the first data packet from the received congestion message. The retrieved information associated with the first data packet includes a value in a packet header of the first data packet, upon which the first data packet was switched or routed from the source device and through switches along the data path initially traveled by the first data packet. In some embodiments, the value is used as an input to a hash function at the source device or a switch along the data path to generate an output value associated with an egress port of that source device or switch, such that the first data packet is sent to a switch of the next stage coupled to the egress port via the egress port. Thus, to deviate a data flow of a second data packet sent to the same destination device as the first data packet around the congested switch, the source device can be configured to change the value for switching or routing in the packet header of the second data packet. For example, the source device can be configured to randomly select a value from a set of values that are different from the previous value for switching or routing and that are valid as an input to the hash function. Alternatively, other methods can be used to determine a different value for switching or routing for the second data packet. As a result, an output value different from the previous output value associated with the first data packet can be likely generated by the hash function at the source device or a switch. Subsequently, the second data packet can be likely sent out from an egress port different from the previous egress port from which the first data packet was sent out, at the source device or a switch. As a result, the second data packet is likely to be deviated around the congested switch, through which the first data packet was switched or routed.

In the example of FIGS. 3-6, upon determining a congestion situation, switch 350 is configured to define congestion message 600 based on data packet 500 that is associated with a data flow sent from source device 310 to destination device 360 via switch 330 and switch 350, shown as data path 375 in FIG. 3. Switch 350 is then configured to send congestion message 600 to source device 310, for example, via switch 330 (shown as data path 378 in FIG. 3). After receiving congestion message 600, source device 310 is configured to determine the data flow to be regulated, and a first value in packet header 510 that is used for switching or routing data packet 500, based on packet header 510 (or a portion of packet header 510) retrieved from congestion message 600. Furthermore, source device 310 is configured to determine switch 350 is a congestion root by checking the congestion type field 620 of congestion message 600. Thus, to deviate a second data packet that is to be sent from source device 310 to destination device 360 around switch 350, source device 310 is configured to randomly select a second value for switching or routing that is different from the first value included in packet header 510 of data packet 500, and include the second value in a packet header of the second data packet. As a result, the second data packet is sent from source device 310 to destination device 360 via switch 320 and switch 340 along a data path (shown as data path 370 in FIG. 3) different from the previous data path (shown as data path 375 in FIG. 3) for data packet 500. This data path 370 successfully deviates around switch 350.

Note that in some embodiments, for example when a hash function is used to determine an egress port based on an input value retrieved from a packet header of a data packet, different egress ports are not necessarily determined based on different input values. In other words, the same egress port may be selected based on two different input values. Consequently, the second data packet may be sent to the congested switch in some scenarios even though a different value for switching or routing is used for the second data packet.

In some embodiments, if a source device determines a data flow is to be regulated based on a congestion message sent from a switch, and determines the switch is a congestion victim instead of a congestion root associated with the data flow based on the congestion message, the source device can be configured to reduce a data rate at which data packets of the data flow are sent from the source device. In such embodiments, the source device is not necessarily configured to modify the value used for switching or routing that is included in the data packets of the data flow. In the example of FIG. 3, upon determining a congestion situation caused by data packets of a data flow that are sent from source device 310 to destination device 360 via switch 330 and switch 350 (shown as data path 375 in FIG. 3), switch 330 is configured to define a congestion message based on a data packet (e.g., data packet 500) associated with the data flow, and then send the congestion message to source device 310 (data path not shown in FIG. 3), where the congestion message identifies switch 330 as a congestion victim. After receiving such a congestion message, source device 310 is configured to reduce the data rate at which source device 310 sends out data packets associated with the data flow. Meantime, source device 310 does not change the value for switching or routing included in the data packets. Consequently, the data packets associated with the data flow are sent from source device 310 to destination device 360 via switch 330 and switch 350 at the reduced data rate.

In some embodiments, in addition to other actions, a source device can be configured to reduce a data rate at which data packets associated with a data flow are sent out from the source device in response to receiving a congestion message from a congested switch, regardless of the congestion message identifying the congested switch as a congestion root or not. In such embodiments, if the congested switch is a congestion root, the source device can be configured to reduce the data rate for sending data packets associated with the data flow, in addition to taking actions to deviate the data packets around the congested switch.

In some embodiments, in response to receiving a congestion message destined to a source device from a congested switch, a second switch that is adjacent and downstream to the congested switch with respect to the congestion message can be configured to reduce a data rate at which data packets associated with one or more data flows are sent from the second switch to the congested switch. Alternatively, the second switch can be configured to limit the data rate at which data packets associated with one or more data flows are sent from the second switch to the congested switch under a threshold. As a result, the second switch that reduces or limits a data rate is not sending data packets at substantially the maximum rate, or in other words, is under flow control. Thus, if the second switch is in a congestion situation itself at the same time, the second switch is identified as a congestion victim instead of a congestion root. In the example of FIGS. 3-6, in response to receiving congestion message 600 sent from switch 350 to source device 310, switch 330 is configured to limit a data rate, at which switch 330 sends data packets to switch 350, under a threshold. As a result, switch 330 is not sending data packets at substantially the maximum rate. Thus, if switch 330 is in a congestion situation at the same time, switch 330 is identified as a congestion victim but not a congestion root.

Alternatively, in some embodiments, a congested switch can be configured to send a second type congestion message to one or more second switches that are adjacent and upstream to the congested switch with respect to data flow(s) that cause the congestion at the congested switch. The second type congestion message is different from the congestion message (e.g., congestion message 600) sent from a congested switch to a source device as described herein. Upon receiving a congestion message of the second type, each second switch can be configured to reduce a data rate for sending data packets to the congested switch accordingly. In such embodiments, more than one threshold associated with an output queue of a switch are typically implemented. For example, as shown in FIGS. 3-4, when the number of data packets stored in output queue 355 of switch 350 reaches a first threshold of 100, or equivalently, when output queue 355 of switch 350 has an available capacity less than a first threshold represented by T1 in FIG. 4, switch 350 can be configured to send a congestion message of the second type to switch 330 and/or switch 320 such that switch 330 and/or switch 320 can reduce a data rate for sending data packets to switch 350. Furthermore, when the number of data packets stored in output queue 355 of switch 350 reaches a second threshold of 120, or equivalently, when output queue 355 of switch 350 has an available capacity less than a second threshold represented by T2 in FIG. 4, switch 350 can be configured to define and send a congestion message (e.g., congestion message 600) to source device 310, as described in detail above.

In some embodiments, a switch of a multi-stage switch fabric has a non-transitory processor-readable medium that stores code representing instructions to be executed by a processor of the switch, and the code comprises code to cause the processor of the switch to perform a series of operations as described in detail herein. Specifically, the code can cause the processor of the switch to, among other operations, store a received data packet associated with a data flow in an output queue of the switch, define a congestion message based on the stored data packet, send the defined congestion message to a source device such that data packets associated with the data flow are sent at a lower rate from the source device to the switch, etc.

Figure 7:
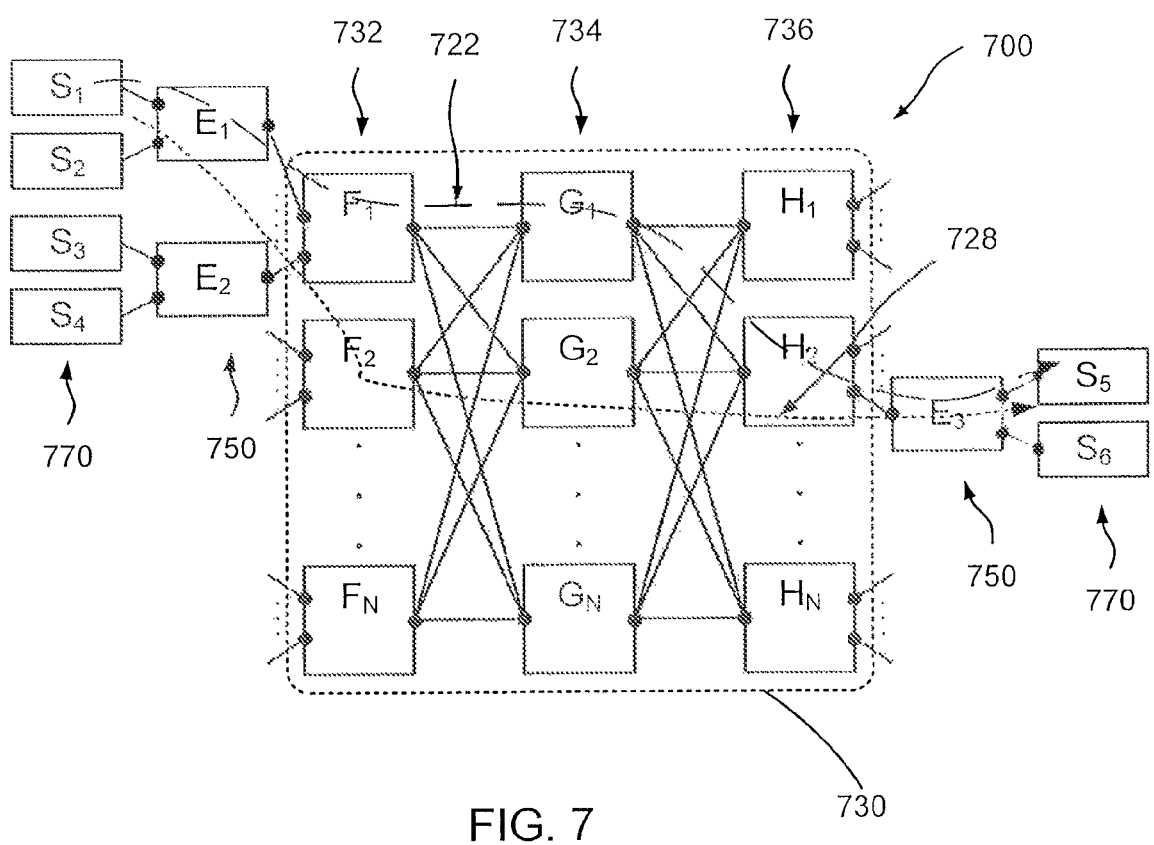
FIG. 7 is a schematic illustration of a multi-stage switch fabric system configured to forward data packets from a source device to a destination device, according to an embodiment.

FIG. 7 is a schematic illustration of a multi-stage switch fabric system 700 configured to forward data packets from a source device to a destination device, according to an embodiment. The switch fabric system 700 includes a multi-stage switch fabric 730, multiple edge devices 750 operatively coupled to the switch fabric 730, and multiple peripheral processing devices 770 operatively coupled to the edge devices 750. As described in further detail herein, a first peripheral processing device 770 (e.g., $S_1$) is configured to send data packets to a second peripheral processing device 770 (e.g., $S_5$) via one or more than one data paths (e.g., data path 722, data path 728 shown in FIG. 7) through the switch fabric 730.

The switch fabric 730 can be structurally and functionally similar to the multi-stage switch fabric 200 described with respect to FIG. 2. Accordingly, the switch fabric 730 includes switch modules $F_1$-$F_N$ associated with a first stage 732 of the switch fabric 730, switch modules $G_1$-$G_N$ associated with a second stage 734 of the switch fabric 730, and switch modules $H_1$-$H_N$ associated with a third stage 736 of the switch fabric 730. Said another way, switch modules $F_1$-$F_N$ associated with the first stage 732, switch modules $G_1$-$G_N$ associated with the second stage 734 and switch modules $H_1$-$H_N$ associated with the third stage 736 collectively define the multi-stage switch fabric 730.

As shown in FIG. 7, each switch module $F_1$-$F_N$ associated with the first stage 732 is operatively coupled to each switch module $G_1$-$G_N$ associated with the second stage 734 via data paths. Similarly, each switch module $G_1$-$G_N$ associated with the second stage 734 is operatively coupled to each switch module $H_1$-$H_N$ associated with the third stage 736 via data paths. The data paths between the switch modules $F_1$-$F_N$ associated with the first stage 732 and the switch modules $G_1$-$G_N$ associated with the second stage 734 and/or the data paths between the switch modules $G_1$-$G_N$ associated with the second stage 734 and the switch modules $H_1$-$H_N$ associated with the third stage 736 can be constructed in any manner configured to facilitate data transfer. In some embodiments, for example, the data paths include optical connectors, optical fibers and/or electrical connectors between the switch modules. In some embodiments, the data paths are within a midplane or a backplane.

The peripheral processing devices 770 can be structurally and functionally similar to the peripheral processing devices 111-116 described with respect to FIG. 1. Specifically, the peripheral processing devices 770 can be, for example, compute nodes, service nodes, routers, and storage nodes, etc. The peripheral processing devices 770 can be operatively coupled to the edge devices 750 using any suitable connection such as, for example, an optical connection (e.g., an optical cable and optical connectors), an electrical connection (e.g., an electrical cable and electrical connectors) and/or the like. As such, the peripheral processing devices 770 are configured to send data packets to the edge devices 750.

The edge devices 750 can be structurally and functionally similar to the edge devices 181-183 described with respect to FIG. 1. Specifically, the edge devices 750 can be any devices configured to operatively couple peripheral processing devices 770 to the switch fabric 730. In some embodiments, for example, the edge devices 750 can be access switches, input/output modules, top-of-rack devices and/or the like. Edge device $E_1$ is schematically shown as a source edge device and edge device $E_3$ is schematically shown as a destination edge device with respect to the peripheral processing device $S_1$ sending data packets to peripheral processing device $S_5$, for illustration purposes only. Structurally, the edge devices 750 (including $E_1$-$E_3$) can function as both source edge devices and destination edge devices. Accordingly, the edge devices 750 can send data packets to and receive data packets from the switch fabric 730.

While shown in FIG. 7 as being operatively coupled to a single switch module $F_1$ associated with the first stage 732, the edge device $E_1$ can be coupled to multiple switch modules associated with the first stage 732. Additionally, while shown in FIG. 7 as being operatively coupled to a single switch fabric 730, the edge device can be operatively coupled to multiple switch fabrics, similar to switch fabric 730. In some embodiments, for example, the edge device $E_1$ can be both coupled to the switch module $F_1$ associated with the first stage 732 of the switch fabric 730 and a switch module associated with a first stage of a second switch fabric (not shown in FIG. 7). In such embodiments, the edge device $E_1$ can send data to either the switch module $F_1$ or the switch module associated with the first stage of the second switch fabric.

In use, for example, a peripheral processing device $S_1$ can be configured to send data packets to another peripheral processing device $S_5$. FIG. 7 represents peripheral processing device $S_1$ sending data packets to peripheral processing device $S_5$ through the switch fabric 730. Any peripheral processing device 770 operatively coupled to the switch fabric 730 via an edge device 750 can be configured to send data packets to any other peripheral processing device 770 coupled to the switch fabric 730 via an edge device 750 in a similar way.

As a first step, peripheral processing device $S_1$ can send a first data packet to edge device $E_1$. Edge device $E_1$ can be configured to define a packet header for the first data packet, which includes a destination address (e.g., an IP address, a MAC address) of a destination edge device (e.g., edge device $E_3$) based on information retrieved from the received data packet. The packet header of the first data packet also includes a first value for switching or routing the first data packet. Then, edge device $E_1$ can be configured to determine to which switch module $F_1$-$F_N$ to send the first data packet based on the first value for switching or routing, and send the first data packet accordingly. In some embodiments, for example, edge device $E_1$ can use a hash function using the first value for switching or routing as an input to determine to which switch module $F_1$-$F_N$ to send the first data packet. In the example of FIG. 7, edge device $E_1$ determines to send the first data packet to switch module $F_1$ and sends the first data packet accordingly.

After a switch module associated with the first stage 732 (e.g., switch module $F_1$, switch module $F_2$, etc.) or a switch module associated with the second stage 734 (e.g., switch module $G_1$, switch module $G_2$, etc.) receives the first data packet from an edge device or a switch module associated with the previous stage, the switch module can store the first data packet in an output queue of the switch module. Next, the switch module can determine to which switch module associated with the next stage to send the first data packet based on the first value for switching or routing retrieved from the packet header of the first data packet, and then send the first data packet accordingly. Similar to edge device $E_1$, a switch module associated with the first stage 732 or a switch module associated with the second stage 734 can use a hash function using the first value for switching or routing as an input to determine to which switch module associated with the next stage to send the first data packet. In the example of FIG. 7, switch module $F_1$ determines to send the first data packet to switch module $G_1$ based on the first value for switching or routing, and switch module $G_1$ determines to send the first data packet to switch module $H_2$ based on the first value for switching or routing. Thus, the first data packet is sent to switch module $H_2$ via switch module $F_1$ and switch module $G_1$.

After a switch module associated with the third stage 736 (e.g., switch module $H_1$, switch module $H_2$, etc.) receives the first data packet from a switch module associated with the second stage 734, the switch module associated with the third stage 736 can store the first data packet in an output queue of the switch module. Next, the switch module associated with the third stage 736 can determine to which edge device 750 to send the first data packet based on the destination address of the destination edge device retrieved from the packet header of the first data packet, and then send the first data packet accordingly. After receiving the first data packet, an edge device 750 can forward the first data packet to a destination peripheral processing device of the first data packet. In the example of FIG. 7, switch module $H_2$ determines to send the first data packet to edge device $E_3$ based on the address of edge device $E_3$ that is included in the packet header of the first data packet, and sends the first data packet to edge device $E_3$ accordingly. Subsequently, the first data packet is forwarded by edge device $E_3$ to peripheral processing device $S_5$. Thus, the first data packet is sent from peripheral processing device $S_1$ to peripheral processing device $S_5$ via data path 722 shown in FIG. 7, through edge device $E_1$, switch modules $F_1$, $G_1$, $H_2$ and edge device $E_3$.

In some embodiments, when a switch module of the switch fabric 730 is in a congestion situation, the switch module can notify a source edge device such that the source edge device can take actions to reduce a data rate for sending data packets to the congested switch module. As a first step, a switch module in a congestion situation can determine it is a congestion root or not (e.g., by comparing the rate the switch module is sending data packets against a rate threshold, as described in detail with respect to FIGS. 3-4), and retrieve a data packet from an output queue of the switch module. Next, the switch module can define a congestion message based on the determination of the congestion type and the retrieved data packet. Specifically, the congestion message includes a congestion type field (e.g., congestion type field 620 shown in FIG. 6) that identifies the congested switch module as a congestion root or not, and at least a portion of a packet header of the retrieved data packet. The information retrieved from the packet header of the data packet includes the addresses of a source edge device and a destination edge device of the data packet, and the value that is used for switching or routing the data packet.

In the example of FIG. 7, after switch module $G_1$ determines it is in a congestion situation and it is a congestion root, switch module $G_1$ defines a congestion message that identifies switch module $G_1$ as a congestion root. Furthermore, the congestion message is defined based on the first data packet that is retrieved from the output queue of switch module $G_1$. Thus, the congestion message includes addresses of a source edge device (i.e., edge device $E_1$) and a destination edge device (i.e., edge device $E_3$), and the first value for switching or routing that is used to switch or route the first data packet through the switch fabric 730. Subsequently, switch module $G_1$ sends the congestion message to edge device $E_1$ accordingly, for example, via switch module $F_1$.

After edge device $E_1$ receives the congestion message, edge device $E_1$ can modify a packet header of a second data packet that is to be sent from edge device $E_1$ to edge device $E_3$, such that the second data packet can be likely sent via a remaining switch module of the second stage 734 other than switch module $G_1$. In other words, the second data packet can be likely sent from edge device $E_1$ to edge device $E_3$ via a data path different from the data path initially traveled by the first data packet (i.e., data path 722). For example, edge device $G_1$ can define a second value for switching or routing in the packet header of the second data packet, which is different from the first value for switching or routing used for the first data packet. Subsequently, the second value for switching or routing is used, for example, as an input to a hash function at edge device $E_1$, a switch module associated with the first stage 732, and a switch module associated with the second stage 734, to determine to which switch module associated with the next stage to send the second data packet. As a result, such a switch module associated with the next stage to which the second data packet is determined to be sent is likely different from the one determined for the first data packet.

In the example of FIG. 7, edge device $E_1$ uses a second value for switching or routing for the second data packet, where the second value for switching or routing is different from the first value for switching or routing used for the first data packet. As a result, edge device $E_1$, switch module $F_2$, and switch module $G_2$ determine to send the second data packet to switch module $F_2$, switch module $G_2$, and switch module $H_2$, respectively, based on the second value for switching or routing. Furthermore, similar to the scenario of the first data packet, switch module $H_2$ determines to send the second data packet to edge device $E_3$ based on the address of edge device $E_3$ that is included in the packet header of the second data packet, and sends the second data packet to edge device $E_3$ accordingly. Last, the second data packet is forwarded from edge device $E_3$ to peripheral processing device $S_5$. Thus, the second data packet is sent from peripheral processing device $S_1$ to peripheral processing device $S_5$ via data path 728 shown in FIG. 7, through edge device $E_1$, switch modules $F_2$, $G_2$, $H_2$ and edge device $E_3$.

FIG. 8 is a flow chart that illustrates a method for using a received data packet to notify a congestion situation. At 802, a data packet associated with a data flow between a source device and a destination device can be received at a switch within a switch fabric. The data packet has a packet header that contains a source address (e.g., an IP address, a MAC address) of the source device (e.g., an edge device), a destination address of the destination device, and a value that is used at the switch to determine to which switch or other device the data packet is sent. In the example of FIGS. 3-6, data packet 500 associated with a data flow sent from source device 310 to destination device 360 is received at switch 350 with the switch fabric 300 via switch 330, shown as a portion of data path 375 in FIG. 3. Packet header 510 of data packet 500 includes addresses of source device 310 and destination device 360, and a first value that is used to switch or route data packet 500 at source device 310 or any switch within the switch fabric 300.

At 804, the data packet can be stored in an output queue of the switch. In some embodiments, the output queue of the switch can be a first-in-first-out (FIFO) queue. That is, data packets stored in the output queue are processed and sent out from the switch in an order of the data packets being received at the switch. Additionally, in some embodiments, the output queue has a limited capacity for storing data packets. In the example of FIGS. 3-6, data packet 500 is stored in output queue 355 of switch 350 before data packet 500 is sent from switch 350 to destination device 360. At a given time, data packet 500 is stored at the $120^{th}$ position in output queue 355, shown as DP120 in FIG. 4.

At 806, the data packet can be selected from a set of data packets in the output queue if an available capacity of the output queue is less than a threshold. Specifically, if an available capacity of the output queue is less than a threshold, or equivalently, the number of data packets stored in the output queue reaches a threshold, the switch is determined to be in a congestion situation. As a result, a data packet can be selected from the data packets stored in the output queue such that a congestion message can be defined based on the selected data packet. In some embodiments, a specific data packet can be selected from the output queue, such as the data packet that makes the available capacity of the output queue reach the threshold. In some other embodiments, a data packet can be selected from the data packets stored in the output queue in a random fashion.

In the example of FIGS. 3-6, a data packet is selected from data packets stored in output queue 355 if the total number of data packets stored in output queue 355 reaches a threshold of 120, or equivalently, an available capacity of output queue 355 is less than a threshold represented by T2 in FIG. 4. Furthermore, the data packet that causes the total number of data packets stored in output queue 355 to exceed the threshold, i.e., the $120^{th}$ data packet in output queue 355, is selected. Thus, data packet 500 is selected from output queue 355.

At 808, a message including a portion of a header of the data packet and an indicator of a flow control status of the switch can be defined. In some embodiments, a congestion message can be defined based on the data packet that is selected from the set of data packets in the output queue. The congestion message includes at least a portion of a header of the data packet, including for example the addresses of a source device and a destination device of the data packet, and the value that is used to switch or route the data packet. The congestion message also includes an indicator of a flow control status of the switch that indicates the switch is a congestion root or not. In some embodiments, a switch in a congestion situation is a congestion root if the switch is sending data packets at substantially a maximum rate, or in other words, the switch is not under any flow control.

In the example of FIGS. 3-6, congestion message 600 can be defined based on data packet 500 that is selected from the data packets stored in output queue 355 of switch 350. As shown in FIG. 6, congestion message 600 includes packet header 510, or at least a portion of packet header 510, of data packet 500. Specifically, congestion message 600 contains addresses of source device 310 and destination device 360, and the first value included in packet header 510 that is used to switch or route data packet 500 at source device 310 or any switch within the switch fabric 300. Furthermore, congestion message 600 includes a congestion type field 620, which contains an indicator of a flow control status of switch 350.

At 810, the message can be sent from the switch to the source device such that the source device modifies the data flow based on the portion of the header of the data packet and the indicator of the flow control status of the switch. In some embodiments, after a congestion message defined based on a data packet is received at the source device, the source device can be configured to determine the data flow associated with the congestion message based on the portion of the header of the data packet that is included in the congestion message. Then, the source device can take actions to modify the data flow accordingly, based on the congested switch being a congestion root or not according to the indicator of the flow control status of the switch. In some embodiments, if the congested switch is a congestion root, the source device can be configured to change the value included in a header of a second data packet associated with the data flow that is used to switch or route the second data packet through the switch fabric. Specifically, the source device can be configured to change the value from the first value to a different second value, such that the second data packet can be likely switched or routed not through the congested switch. On the other hand, if the congested switch is not a congestion root, the source device can be configured to reduce a rate for sending data packets associated with the data flow to the destination device through the congested switch.

In the example of FIGS. 3-6, congestion message 600, which is defined based on data packet 500, can be sent from switch 350 to source device 310 via, for example, switch 330, shown as data path 378 in FIG. 3. Subsequently, source device 310 is configured to determine the data flow associated with data packet 500 based on the portion of packet header 510 of data packet 500 that is included in congestion message 600. Source device 310 is also configured to determine switch 350 is a congestion root or not, based on the indicator of the flow control status of switch 350 that is included in the congestion type field 620 of congestion message 600. If switch 350 is a congestion root, source device 310 is configured to change the value included in a header of a second data packet associated with the data flow that is used to switch or route the second data packet through the switch fabric 300. Specifically, source device 310 is configured to change the value from the first value included in packet header 510 of data packet 500 to a different second value for the second data packet. As a result, the second data packet is sent from source device 310 to destination device 360 via switch 320 and switch 340, shown as data path 370 in FIG. 3. Thus, the second data packet is deviated around switch 350. On the other hand, if switch 350 is not a congestion root, source device 310 is configured to reduce a rate for sending data packets associated with the data flow to destination device 360. As a result, data packets associated with the data flow are sent to switch 350 at a reduced rate.

While various embodiments have been described above, it should be understood that they have been presented by way of example only, not limitation, and various changes in form and details may be made. Any portion of the apparatus and/or methods described herein may be combined in any combination, except mutually exclusive combinations. The embodiments described herein can include various combinations and/or sub-combinations of the functions, components and/or features of the different embodiments described.

While shown and described above with respect to FIGS. 3-8 as one value included in a packet header of a data packet being used as an input to one or more hash functions to switch or route the data packet through a switch fabric, in other embodiments, more than one value can be included in the packet header of the data packet that are used as an input to one or more hash functions to switch or route the data packet. For example, a packet header of a data packet can include multiple values, each of which is used in switching or routing the data packet at each stage of a multi-stage switch fabric. Thus, when a switch associated with a stage is in a congestion situation, the value associated with that stage and/or a portion of the remaining values can be modified to deviate the data paths of the data packets around the congested switch. For another example, in addition to a general value used to switch or route a data packet, a packet header of the data packet can include another specific value used in switching or routing the data packet in a particular stage of switches in a multi-stage switch fabric. Thus, a source device can select a desired switch associated with the particular stage to which a data packet is sent to by setting the specific value in the packet header of the data packet appropriately.

While shown and described above with respect to FIGS. 3-8 as a source device or a switch using a hash function to select an egress port based on a value included in a packet header of a data packet to send out the data packet, in other embodiments, other methods can be used to determine an egress port to send out the data packet. For example, a switch can store a routing table that maps one or more values to a specific egress port of the switch, such that an egress port of the switch can be determined based on a value in a deterministic way. Thus, a data packet can be deviated around a switch or sent to a switch in a deterministic fashion by setting the value in the packet header of the data packet to an appropriate value.

While shown and described above with respect to FIGS. 1-8 as data packets being sent through a switch fabric and a congestion message being defined based on a received data packet at a switch within the switch fabric, in other embodiments, data items in other forms can be sent through a switch fabric and a congestion message can be defined based on a received data item of other forms at a switch within the switch fabric. For example, a data packet can be decomposed at an edge device into multiple data cells, each of which can be sent through a switch fabric independently. Thus, a congestion message can be defined based on a received data cell at a switch within the switch fabric in a similar way to that of a data packet as described herein.

Some embodiments described herein relate to a computer storage product with a computer-readable medium (also can be referred to as a processor-readable medium) having instructions or computer code thereon for performing various computer-implemented operations. The media and computer code (also can be referred to as code) may be those designed and constructed for the specific purpose or purposes. Examples of computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), and read-only memory (ROM) and RAM devices.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using Java, C++, or other programming languages (e.g., object-oriented programming languages) and development tools. Additional examples of computer code include, but are not limited to, control signals, encrypted code, and compressed code.

What is claimed is:

1. An apparatus, comprising:
   a first switch from a plurality of switches associated with a stage of a switch fabric, the first switch configured to receive a first data packet having a destination address of a destination device from a source device, the first switch configured to store the first data packet in a queue,
   the first switch configured to define a message based on the queue having an available capacity less than a threshold, the first switch configured to include a congestion root indicator in the message if the available capacity of the queue is decreasing and the first switch is sending data packets at substantially a maximum rate, the first switch is configured to not include the congestion root indicator in the message if the first switch is sending data packets at a rate substantially less than the maximum rate, the first switch configured to send the message to the source device such that the source device sends a second data packet having the destination address of the destination device to a second switch from the plurality of switches and not to the first switch from the plurality of switches if the message includes the congestion root indicator.

2. The apparatus of claim 1, wherein the first switch is configured to include a congestion victim indicator in the message if the available capacity of the queue is decreasing and the first switch is not sending data packets at substantially the maximum rate.

3. The apparatus of claim 1, wherein the first switch is configured to include a congestion victim indicator in the message if the available capacity of the queue is decreasing and the first switch is not sending data packets at substantially the maximum rate, the first switch configured to send the message to the source device such that the source device reduces a rate of data packets sent to the destination device in response to the message without sending any data packet having the destination address of the destination device to the second switch if the message includes the congestion victim indicator.

4. The apparatus of claim 1, wherein the first switch is configured to route the first data packet based on a hash function using a header of the first data packet as an input.

5. The apparatus of claim 1, wherein the first switch is configured to send the message to the source device such that the source device reduces a rate of data packets sent to the destination device in response to the message.

6. The apparatus of claim 1, wherein the first switch is configured to define the message such that the message includes at least one value associated with a header of the first data packet.

7. The apparatus of claim 1, wherein the first switch is configured to send the message to the source device such that the source device sends the second data packet to the second switch and not to the first switch without reducing a rate of data packets sent to the destination device in response to the message if the message includes the congestion root indicator.

8. A non-transitory processor-readable medium storing code representing instructions to be executed by a processor, the code comprising code to cause the processor to:
   receive, at a switch within a switch fabric, a data packet associated with a data flow between a source device and a destination device;
   store the data packet in a queue of the switch;
   select the data packet from a plurality of data packets in the queue if an available capacity of the queue is less than a threshold;
   define a message including at least a portion of a header of the data packet and an indicator of a flow control status of the switch, the indicator indicates that the switch is a congestion root if the available capacity of the queue is decreasing and the switch is sending data packets at substantially a maximum rate, the indicator indicates that the switch is a congestion victim and not a congestion root if the available capacity of the queue is decreasing and the switch is not sending data packets at substantially the maximum rate; and send the message from the switch to the source device such that the source device modifies the data flow based on the at least the portion of the header of the data packet and the indicator of the flow control status of the switch.

9. The non-transitory processor-readable medium of claim 8, wherein the at least the portion of the header includes at least one value associated with the header of the data packet used by the switch to route the data packet.

10. The non-transitory processor-readable medium of claim 8, wherein the code to cause the processor to send the message includes code to cause the processor to send the message to the source device such that the source device reduces a rate associated with the data flow without modifying a data path through the switch fabric associated with the data flow based on the indicator of the flow control status identifying the switch as a congestion victim.

11. The non-transitory processor-readable medium of claim 8, wherein the code to cause the processor to send the message includes code to cause the processor to send the message to the source device such that the source device reduces a rate associated with the data flow in response to the message.

12. The non-transitory processor-readable medium of claim 8, wherein the code to cause the processor to send the message includes code to cause the processor to send the message to the source device such that the source device modifies a data path through the switch fabric associated with the data flow based on the indicator of the flow control status identifying the switch as a congestion root.

13. The non-transitory processor-readable medium of claim 8, wherein the code to cause the processor to send the message includes code to cause the processor to send the message to the source device such that the source device modifies a data path through the switch fabric associated with the data flow without reducing a rate associated with the data flow based on the indicator of the flow control status identifying the switch as a congestion root.

14. The non-transitory processor-readable medium of claim 8, wherein the data packet is a first data packet, the code to cause the processor to send the message includes code to cause the processor to send the message to the source device at a first time such that the source device is less likely to send a second data packet via the data flow at a second time after the first time than a third data packet via the data flow before the first time, based on the at least the portion of the header of the first data packet and the indicator of the flow control status of the switch.

15. An apparatus, comprising:
a source device configured to send a first data packet to a destination device via a multi-stage switch fabric having a plurality of switches associated with a stage of the multi-stage switch fabric, the source device configured to receive a message from a switch from the plurality of switches in response to the switch receiving the first data packet, the source device configured to define a header of a second data packet to be sent to the destination device in response to the message such that the header of the second data packet is different than a header of the first data packet and the second data packet is configured to be more likely sent to the destination device via a remaining switch from the plurality of switches than the first data packet if the message indicates that a number of data packets in a queue at the switch is increasing and the switch is sending data packets at substantially a maximum rate.

16. The apparatus of claim 15, wherein the source device is configured to reduce a rate at which a plurality of data packets is sent to the destination device based on the message if the message indicates that the number of data packets in the queue at the switch is increasing and the switch is sending data packets at a rate substantially less than the maximum rate.

17. The apparatus of claim 15, wherein the source device is configured not to reduce a rate at which a plurality of data packets is sent to the destination device based on the message if the message indicates that the number of data packets in the queue at the switch is increasing and the switch is sending data packets at substantially the maximum rate.

18. The apparatus of claim 15, wherein the source device is configured to send the first data packet to the destination device via the switch fabric such that the switch from the plurality of switches switches the first data packet based on at least one hash function using a header of the first data packet as an input.

19. The apparatus of claim 15, wherein the message includes at least one value associated with a header of the first data packet.

20. The apparatus of claim 15, wherein the source device is configured to receive the message from the switch in response to the queue at the switch having an available capacity less than a predetermined threshold.

* * * * *